(12) United States Patent
Chopra et al.

(10) Patent No.: US 11,030,057 B2
(45) Date of Patent: Jun. 8, 2021

(54) SYSTEM AND METHOD FOR CRITICAL VIRTUAL MACHINE PROTECTION

(71) Applicant: EMC IP Holding Company LLC, Hopkinton, MA (US)

(72) Inventors: Shelesh Chopra, Bangalore (IN); Sunil Yadav, Bangalore (IN); Manish Sharma, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 240 days.

(21) Appl. No.: 16/028,679

(22) Filed: Jul. 6, 2018

(65) Prior Publication Data

US 2020/0012572 A1 Jan. 9, 2020

(51) Int. Cl.
*G06F 11/14* (2006.01)
*H04L 29/06* (2006.01)
*G06F 9/455* (2018.01)

(52) U.S. Cl.
CPC ...... *G06F 11/1464* (2013.01); *G06F 9/45558* (2013.01); *G06F 11/1469* (2013.01); *H04L 63/20* (2013.01); *G06F 2009/45583* (2013.01); *G06F 2009/45587* (2013.01); *G06F 2201/815* (2013.01)

(58) Field of Classification Search
CPC ............. G06F 11/1464; G06F 11/1469; G06F 9/45558; H04L 63/20
USPC .......................................................... 726/1
See application file for complete search history.

(56) References Cited

U.S. PATENT DOCUMENTS

| | | | | |
|---|---|---|---|---|
| 8,745,185 B1* | 6/2014 | Salo | ..................... | H04L 63/0428 709/223 |
| 9,977,704 B1 | 5/2018 | Chopra et al. | | |
| 10,452,837 B1* | 10/2019 | Roth | ..................... | G06F 21/568 |
| 2007/0250833 A1* | 10/2007 | Araujo, Jr. | ........... | G06F 21/6218 718/1 |
| 2009/0299949 A1* | 12/2009 | Tan | ........................ | G06N 5/025 706/59 |
| 2010/0058432 A1* | 3/2010 | Neystadt | ................ | G06F 21/575 726/1 |
| 2014/0317677 A1* | 10/2014 | Vaidya | ................... | G06F 21/554 726/1 |
| 2015/0271208 A1* | 9/2015 | Gallant | .................. | H04L 9/3247 726/1 |
| 2018/0113622 A1* | 4/2018 | Sancheti | ............. | G06F 11/1451 |

* cited by examiner

*Primary Examiner* — Dant B Shaifer Harriman
(74) *Attorney, Agent, or Firm* — Chamberlain, Hrdlicka, White, Williams & Aughtry

(57) ABSTRACT

A backup agent for facilitating restorations of virtual machines includes a persistent storage and a backup/restoration policy updater. The persistent storage stores backup/restoration policies. The backup/restoration policy updater identifies a change of a label associated with data of a production host and, in response to identifying change in the label, identifies a virtual machine of the virtual machines associated with the data; performs a threat analysis of the identified virtual machine to determine a new security policy for the identified virtual machine; and updates a policy of the backup/restoration policies associated with the identified virtual machine based on the identified new security policy.

19 Claims, 12 Drawing Sheets

Example Production Host Data Tag to Virtual Machine Tag Mapping 500

Data Label 502

Virtual Machine Tag 504

FIG. 5A

Example Virtual Machine Tag to Security Classification Mapping 510

Virtual Machine Tag 512

Security Classification 514

FIG. 5B

Example Security Classification to Security Policy Mapping 520

Security Classification 522

Security Policy 524

FIG. 5C

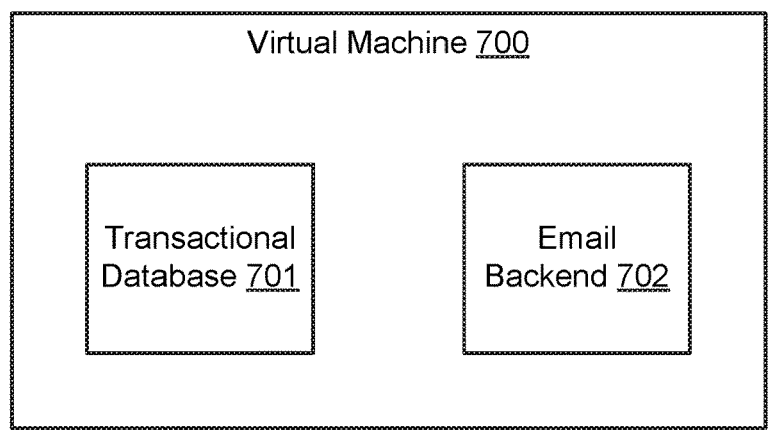
FIG. 7A
Transactional　　　————————　　　Low Security
Database 701　　　　　　　　　　　　Label 710
Email Backend　　————————　　　Low Security
　　702　　　　　　　　　　　　　　　Label 710
FIG. 7B
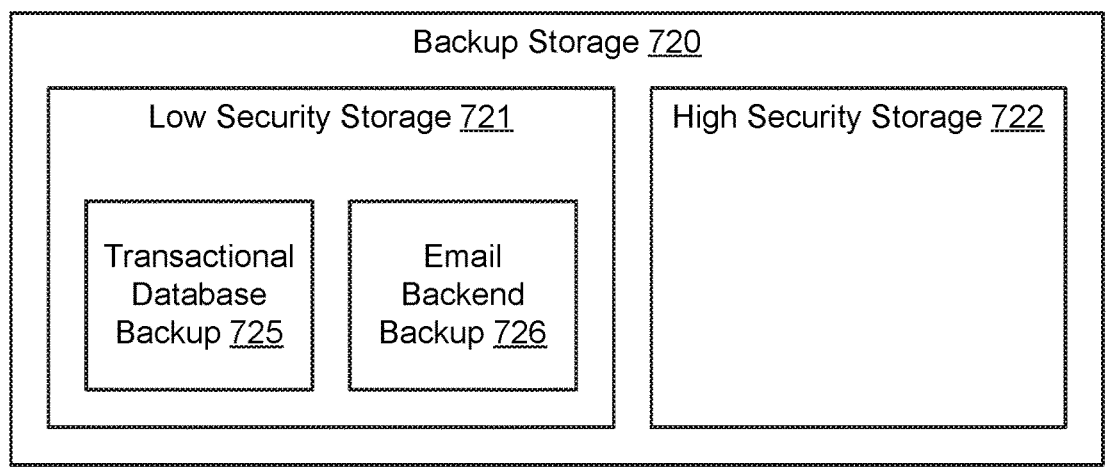
FIG. 7C Transactional Database 701 — High Security Label 711

Email Backend 702 — Low Security Label 710

SYSTEM AND METHOD FOR CRITICAL VIRTUAL MACHINE PROTECTION

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a backup agent for facilitating restorations of virtual machines in accordance with one or more embodiments of the invention includes a persistent storage and a backup/restoration policy updater. The persistent storage stores backup/restoration policies. The backup/restoration policy updater identifies a change of a label associated with data of a production host and, in response to identifying change in the label, identifies a virtual machine of the virtual machines associated with the data; performs a threat analysis of the identified virtual machine to determine a new security policy for the identified virtual machine; and updates a policy of the backup/restoration policies associated with the identified virtual machine based on the identified new security policy.

In one aspect, a method for facilitating restorations of virtual machines in accordance with one or more embodiments of the invention includes identifying a change of a label associated with data of a production host that hosts at least one virtual machine of the virtual machines and, in response to identifying change in the label, identifying a virtual machine of the virtual machines associated with the data; performing a threat analysis of the identified virtual machine to determine a new security policy for the identified virtual machine, wherein performing the threat analysis comprises applying a second tag to a virtual machine based on the change of the label associated with the data of the production host; and updating a policy of backup/restoration policies associated with the identified virtual machine based on the identified new security policy.

In one aspect, a non-transitory computer readable medium in accordance with one or more embodiments of the invention includes computer readable program code, which when executed by a computer processor enables the computer processor to perform a method for facilitating restorations of virtual machines. The method includes identifying a change of a label associated with data of a production host that hosts at least one virtual machine of the virtual machines and, in response to identifying change in the label, identifying a virtual machine of the virtual machines associated with the data; performing a threat analysis of the identified virtual machine to determine a new security policy for the identified virtual machine, wherein performing the threat analysis comprises applying a second tag to a virtual machine based on the change of the label associated with the data of the production host; and updating a policy of backup/restoration policies associated with the identified virtual machine based on the identified new security policy.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5A shows a diagram of an example data to virtual machine mapping in accordance with one or more embodiments of the invention.

FIG. 5B shows a diagram of an example virtual machine to security classification mapping in accordance with one or more embodiments of the invention.

FIG. 5C shows a diagram of an example security classification to security policy mapping in accordance with one or more embodiments of the invention.

FIG. 7A shows a diagram of an example of a virtual machine.

FIG. 7B shows a diagram of mappings.

FIG. 7C shows a diagram of a backup storage at a first point in time.

DETAILED DESCRIPTION

Figure 1:
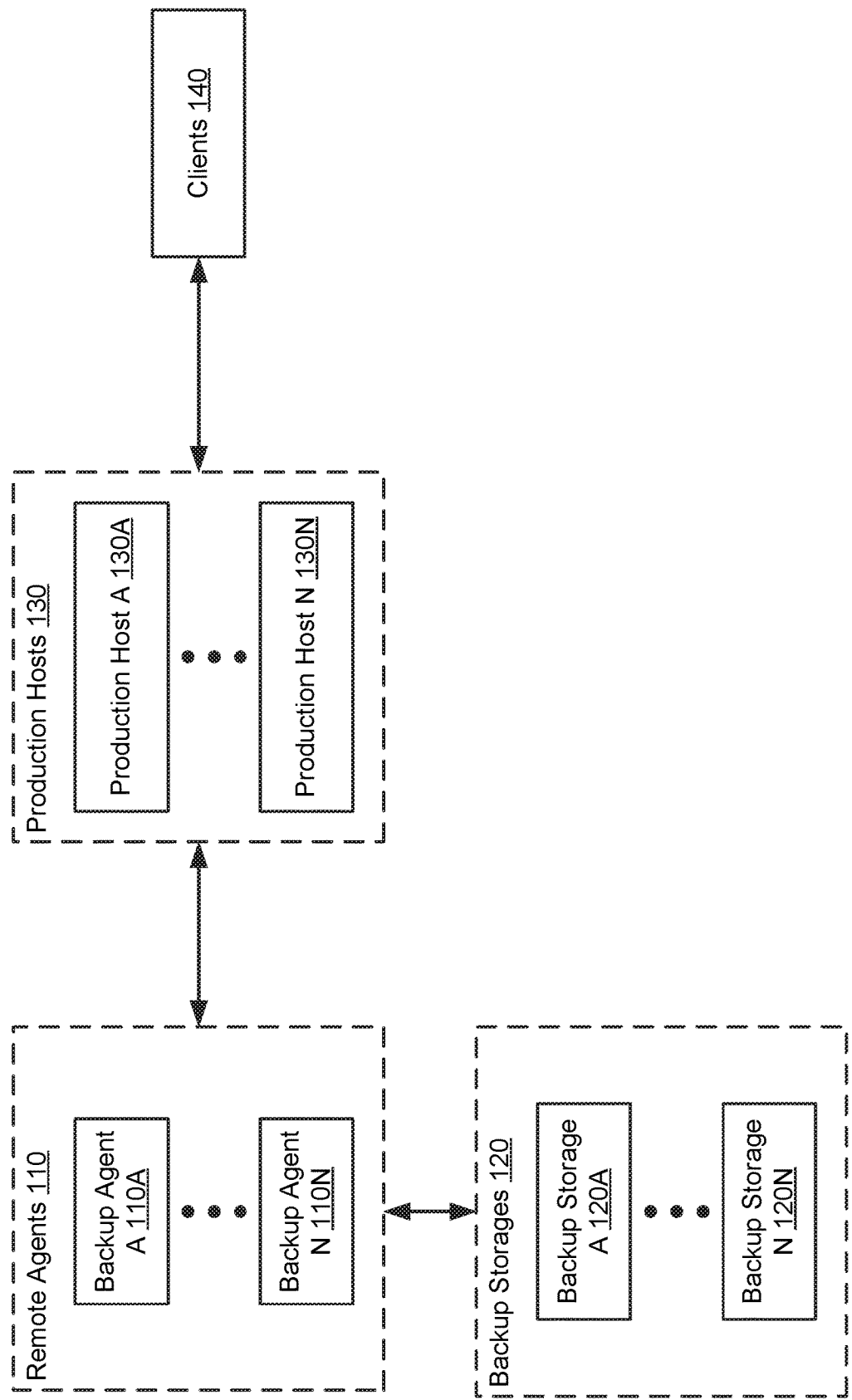
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines. More specifically, the systems, devices, and methods may provide an automated method for ensuring that workflows for performing backups or restorations of virtual machine or applications are commensurate with the importance of the virtual machine or application data.

In one or more embodiments of the invention, the system may automatically detect an importance of a virtual machines, or application, based on client activity. In other words, the interaction between clients and a virtual machine may be monitored and used to determine how and when virtual machine, or other executing entities such database applications, should be backed up and/or restored.

In this manner, one or more embodiments of the invention may address the problem of backup generation failure in a distributed system. Doing may increase the reliability of virtual machines and other executing application in the distributed environment.

In one or more embodiments of the invention, a system may automatically update backup and/or restoration workflows based on client ascribed characteristics, e.g., labels applied by clients. By automatically updating the workflows, embodiments of the invention may adapt to the changing roles of virtual machines, or other applications, in a distributed environment.

In one or more embodiments of the invention, the system may modify virtual machine level workflows when only a portion of the data of the virtual machine is labeled. By doing so, embodiments of the invention may decrease the threat of data loss or misappropriate of data by their party attackers. In one or more embodiments of the invention, virtual machines are grouped, e.g., tagged, based on labeling applied to data.

As will be discussed in greater detail below, embodiments may address multiple, additional problems beyond those discussed above.

FIG. 1 shows an example system in accordance with one or more embodiments of the invention. The system may include production hosts (130) that host virtual machines exposed to clients (140). The system may further include remote agents (110) that provide services to the production hosts. The services may include data storage in backup storages (120) and restorations of virtual machines using the data stored in the backup storages (120). The remote agents may adapt the services provided to the production hosts (130) based on characteristics ascribed to the production hosts by the clients (140). Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 8.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines.

In one or more embodiments of the invention, the clients (140) may label portions of the production hosts. The labels may ascribe characteristics to the labeled portion. The label may, for example, indicate an importance of the portion to the client, a criticality for maintaining the security of the portion, or another characteristic. A portion of the production hosts may be labeled any number of times with labels of any content.

In one or more embodiments of the invention, the labels are metadata associated with the labeled portion of the production host. The metadata may be, for example, an identifier that indicates a characteristic of the labeled portion ascribed by a client.

In one or more embodiments of the invention, the labeling is applied at a granular level. For example, labels may be applied at a file or application level. As will be discussed below in greater detail, the production hosts (130) may host any number of virtual machines each hosting any number of applications and corresponding application data. The labeling may be applied at an application and/or application data level. The labeling may be performed at a more granular level, e.g., file-system block level, portion of a file, portion of a database, etc., without departing from the invention.

In one or more embodiments of the invention, the labels are applied dynamically. In other words, the clients (140) may apply new labels, change labels, or remove labels at any point in time. For example, as the function of a virtual machine hosted by a production host changes, clients may change the labels applied to applications executing on the virtual machine to indicate that the application data is both important for business purposes and sensitive for security purposes.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 8.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines.

As noted above, clients may label different portions of the production hosts, e.g., application data, applications, etc. The labels may be stored on the production hosts (130) or on other entities without departing from the invention. For additional details regarding the production hosts (130), See FIG. 2.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 6A-6D. The remote agents (110) may be other types of computing devices without departing from the invention. For additional details regarding computing devices, See FIG. 8.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to virtual machines. The services may include storing virtual machine data, generating backups of the virtual machines, and/or performing restorations of virtual machines.

In one or more embodiments of the invention, the remote agents (110) provide the aforementioned services by performing backup or restoration workflows. Doing so may generate a backup that is usable for restoration purposes or restore a virtual machine to a previous state, respectively. The steps in the aforementioned workflows may be governed by policies. Each workflow may include any number of steps. Different workflows may include different numbers and different types of steps.

In one or more embodiments of the invention, the backup/restoration workflows vary depending on the characteristics ascribed to the portions of the production hosts by the clients (140). In other words, performing a backup or restoration may include different steps and have a different outcome depending on how the portion of the production host has been labeled by users.

In one or more embodiments of the invention, the policies may specify the steps of the backup/restoration workflows on a per-virtual machine basis. In other words, when a backup or restoration is performed, the policy associated with the virtual machine hosting the portion governs the workflow. The remote agents (110) may dynamically modify the policies based on the labeling by the clients. For additional details regarding backup/restoration policies, See FIGS. 4A-4B. For additional details regarding remote agents, See FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 6A-6D. For additional details regarding computing devices, See FIG. 8.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines. In one or more embodiments of the invention, a backup of a virtual machine is a data structure that reflects a state of a virtual machine at a predetermined point in time or changes to a state over a period of time. For example, a backup of a virtual machine may be an image of the virtual machine, a difference disk of the virtual machine, a log of an application executing on the virtual machine, or other types of data structures. An image of a virtual machine may include all of the virtual machine data at a point in time. A difference disk may be the changes made to virtual machine data over a period of time. A log may be changes made to application data made over a period of time. The backup of a virtual machine may be other types of data structures that may be used to restore a virtual machine to a previous state without departing from the invention.

Multiple backups of varying types may be used to restore a virtual machine to a previous state. These multiple backups may be referred to as a continuity chain. Each backup of the continuity chain may be usable in combination with other members of the continuity chain for restoration purposes. For example, a virtual machine image may be used to restore a virtual machine to a state of the virtual machine at the time the image was generated. In another example, a virtual machine image and a difference disk for a period of time immediately following the point in time associated with the image may be used to restore a virtual machine to a state of the virtual machine at the end of the period of time following the point in time.

In such a scenario, the virtual machine image and difference disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

In one or more embodiments of the invention the backup storages (120) are deduplicated storages. A deduplicated storage may attempt to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage.

Figure 2:
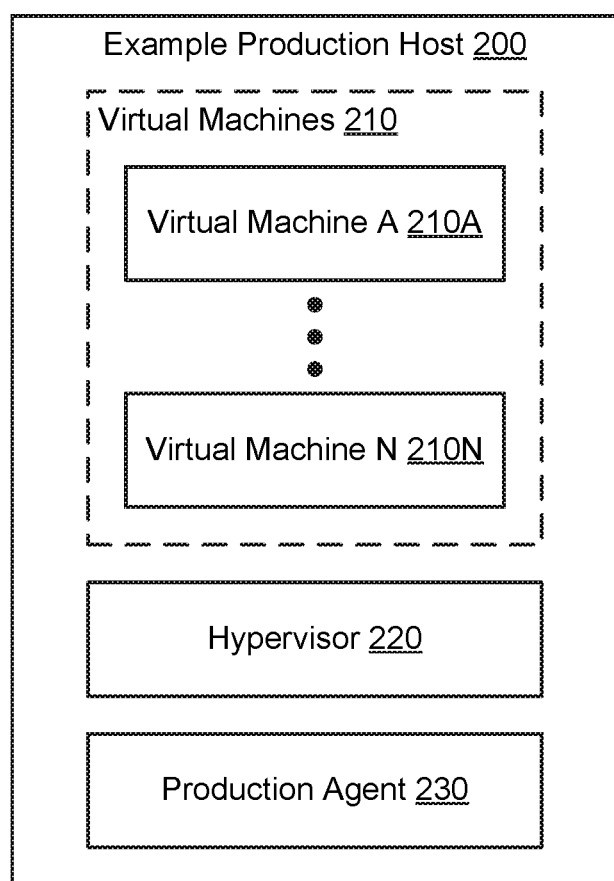
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts virtual machines (210). The example production hosts (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, an image of each of the virtual machines (210) at points in time in the past may be stored, i.e., stored locally on a production host hosting the respective virtual machine. Following the points in time in the past, a differencing disk that stores each of the changes made from the image of each of the virtual machines (210) may be stored. The aforementioned images and differencing disks may be stored locally or in a backup storage.

In one or more embodiments of the invention, logs associated with applications hosted by the virtual machines (210) may be generated. A log may reflect changes to application data. Logs may be used in combination with virtual machine images and/or differencing disks to restore virtual machines to predetermined states and/or applications to predetermined states.

In one or more embodiments of the invention, generating a backup of a virtual machine includes storing a copy of the image of the virtual machine, a differencing disk, and/or a log of one or more applications hosted by the virtual machine in a backup storage. Thus, when performing a restoration of a virtual machine, the differencing disks and/or logs may be merged with a virtual machine image to obtain a representation of the virtual machine and/or application at the point in time following the periods of time reflected by each of the differencing disks and/or logs.

In one or more embodiments of the invention, the example production host (200) includes a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (230) that manages the storage of virtual machine data, e.g., images, difference disks, and logs, in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate restorations of virtual machines, applications, or other entities.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

Figure 3:
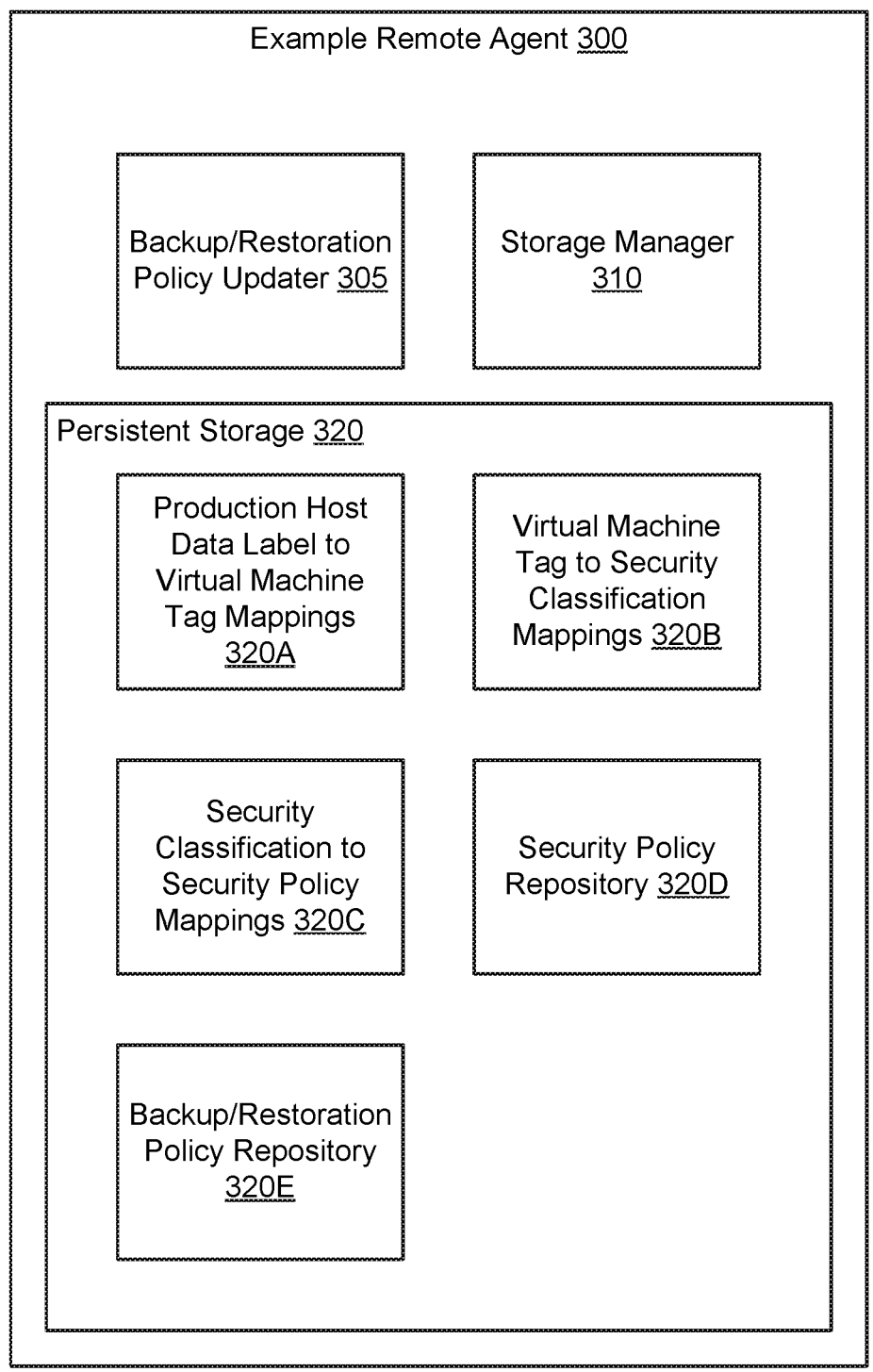
FIG. 3 shows a diagram of an example remote agent in accordance with one or more embodiments of the invention.

When generating a backup or performing a restoration of a virtual machine, a remote agent may store or access data in a backup storage. FIG. 3 shows a diagram of an example remote agent (300) in accordance with one or more embodiments of the invention. The example remote agent (300) may include a backup/restoration policy updater (305), a storage manager (310), and a persistent storage (320). Each component of the example remote agent (300) is discussed below.

In one or more embodiments of the invention, the backup/restoration policy updater (305) is a hardware device including circuitry. The backup/restoration policy updater (305) may be, for example, digital signal processor, a field programmable gate array, or an application specific integrated circuit. The backup/restoration policy updater (305) may be other types of hardware devices without departing from the invention.

In one or more embodiments of the invention, the backup/restoration policy updater (305) is implemented as computing code stored on a persistent storage that when executed by a processor performs the functionality of the backup/restoration policy updater (305). The processor may be hardware processor including circuitry such as, for example, a central processing unit or a microcontroller. The processor may be other types of hardware devices for processing digital information without departing from the invention.

In one or more embodiments of the invention, the backup/restoration policy updater (305) updates policies of the backup/restoration policy repository (320E). The backup/restoration policy updater (305) may update the policies based on labeling activity by clients. Updating the policies based on labeling activity by clients may ensure that the policies reflect the relative importance, criticality, or other characteristics ascribed by clients. The backup/restoration policy updater (305) may update the policies using information in the persistent storage (320). The backup/restoration policy updater (305) may perform all, or portion, of the methods illustrated in FIGS. 6A-6D.

In one or more embodiments of the invention, the storage manager (310) is a hardware device including circuitry. The storage manager (310) may be, for example, digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the storage manager (310) performs backup and restoration workflows governed by policies stored in the backup/restoration policy repository. In other words, the storage manager (310) may perform a series of steps specified by policies of the backup/restoration policy repository to complete a backup or restoration workflow. The storage manager (310) may perform all, or portion, of the methods illustrated in FIGS. 6A-6D.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality.

The data structures stored by the persistent storage (320) may include production host data to virtual machine tag mappings (320A), virtual machine tag to security classification mappings (320B), security classification to security policy mappings (320C), a security policy repository (320D), and a backup/restoration policy repository (320E). Each of the aforementioned data structures is discussed below.

The production host data label to virtual machine tag mappings (320A) may specify associations between different types of labels applied by clients to corresponding tags that should be applied to virtual machines, e.g., virtual-machine level tags. In other words, each portion of data, e.g., application data, applications, etc., of a production host may be labeled by a client. Different labels applied to the data may indicate that different virtual machine level tags should be applied. Thus, when production host data is labeled by a client, the label that should be applied to a virtual machine may be determined using these mappings. For additional details regarding the production host data label to virtual machine tag mappings (320A), See, FIG. 5A.

The virtual machine tag to security classification mappings (320B) may specify associations between virtual machine tags and security classifications. In other words, a security classification may be identified based on a virtual machine tag type using these mappings. For additional details regarding the virtual machine tag to security classification mappings (320B), See, FIG. 5B.

The security classification to security policy mappings (320C) may specify associations between security classifications and security policies. In other words, a security policy of the security policy repository may be identified based on a security classification. The identified policy may then be used to either (i) update a policy of the backup/restoration policy repository or (ii) modify a workflow without modifying the policies of the backup/restoration policy repository. For example, a security policy of the security policy repository (320D) may override steps of the policy of the backup/restoration policy repository. For additional details regarding the security classification to security policy mappings (320C), See, FIG. 5C.

Thus, using the aforementioned data structures, a security policy may be identified based on a label applied to data of a production host by a client. Accordingly, when data is labeled by clients, security policies of the security policy repository (320D) implicated by the labeling activity may be identified.

The security policy repository (320D) may specify minimum standards for workflows or modifications for workflows. In other words, the security policy repository (320D) may be used to modify workflows for backup or restoration purposes based on data labeling of a production host. For example, a database hosted by a production host may be initially labeled as low security. Overtime, the importance of the database may increase and for which a client relabeled the database as high security. In such a scenario, the labeling activity by the client would implicate that a different security policy of the security policy repository (320D) applied to the virtual machine of the production host that hosts the database. The newly implemented security policy may modify the workflow for restoration of the virtual machine to, for example, limit the clients that are able to initiate a restoration of the virtual machine. Doing so may reduce the likelihood that a malicious third party may be able to damage or disrupt the system.

The backup/restoration policy repository (320E) may specify workflows for backup or restoration purposes. The workflows may specify that actions to be performed to generate a backup or restore a virtual machine. In one or more embodiments of the invention, the backup/restoration policy repository (320E) includes policies that specify different workflows. Each of the policies may be associated with different virtual machines, different data, or other portions of the production hosts. For additional details regarding policies, See, FIGS. 4A-4B.

While illustrated as being stored in the example remote agent (300) and as separate structures, the aforementioned data structures may be stored in other locations, distributed across multiple computing devices, divided into any number of data structures, or combined with each other or any other data structures without departing from the invention. Additionally, the persistent storage (320) may store additional, different, or less data without departing from the invention.

To further clarify aspects of embodiments of the invention, diagrams of data structures of the system of FIG. 1 are illustrated in FIGS. 4A-5C. The data structures may be used when performing all or a portion of the methods illustrated in FIGS. 6A-6D.

Figure 4A:
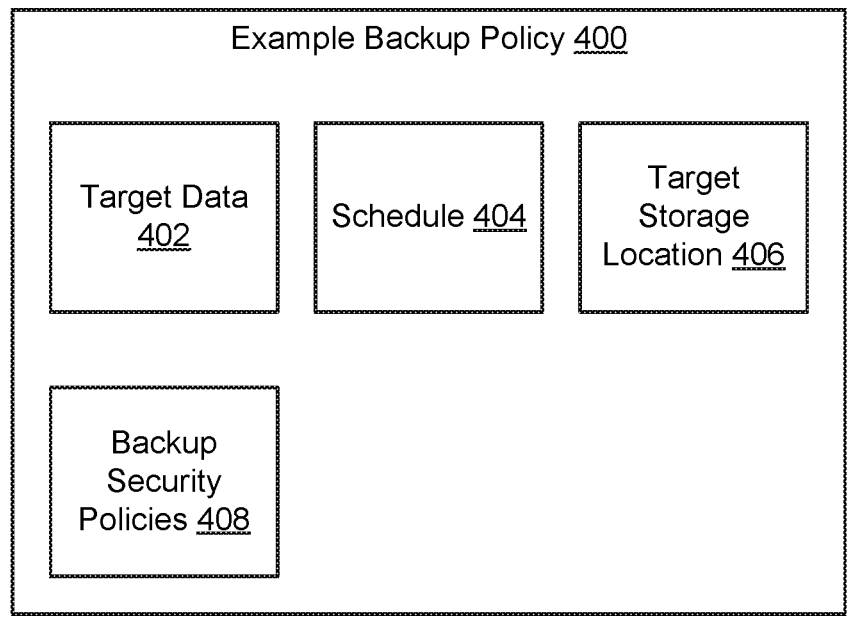
FIG. 4A shows a diagram of an example backup policy in accordance with one or more embodiments of the invention.

FIG. 4A shows a diagram of an example backup policy (400) in accordance with one or more embodiments of the invention. The example backup policy (400) may specify a workflow for performing a backup. To specify the workflow, the example backup policy (400) may specify the target data (402) of a production host, a schedule (404) for when one or more backups are to be performed, a target storage location (406) for the generated backup, and/or backup security policies (408). The backup security policies (408) may be based on security policies from the security policy repository (e.g., 320D, FIG. 3). While the example backup policy (400) is illustrated with a limited number of portions that specify different aspects of a backup workflow, backup policies may specify additional, fewer, or different aspects of a workflow without departing from the invention.

In one or more embodiments of the invention, the backup security policies (408) specify a limited number of storage locations where the backup may be stored. In one or more embodiments of the invention, the backup security policies (408) specify a limited number of clients (or users) that may initiate generation of a backup. In one or more embodiments of the invention, the backup security policies (408) specify a redundancy level, e.g., the number of copies stored to different locations, for the generated backup. In one or more embodiments of the invention, the backup security policies (408) specify a quantity of computing resources to dedicate toward generating the backup. The backup security policies (408) may specify other aspects of a backup workflow that enhance, modify, or reduce the security of generating a backup without departing from the invention.

Figure 4B:
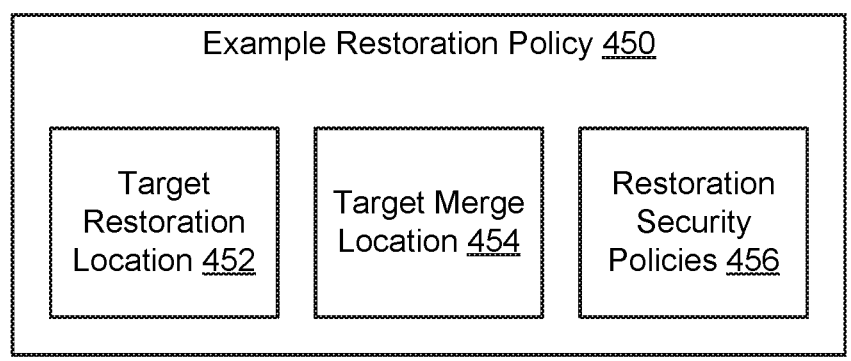
FIG. 4B shows a diagram of an example restoration policy in accordance with one or more embodiments of the invention.

FIG. 4B shows a diagram of an example restoration policy (450) in accordance with one or more embodiments of the invention. The example restoration policy (450) may specify a workflow for performing a restoration of a virtual machine. Performing a restoration of a virtual machine may result in the instantiation of a virtual machine that is similar to an existing machine.

To specify the restoration workflow, the example restoration policy (450) may specify a target restoration location (452), a target merge location (454), and restoration security policies (456). The target restoration location (452) may be an identifier of a computing device, e.g., a production host, where the restored virtual machine is to be located. The target merge location (454) may be an identifier of a computing device where the instantiation of the virtual machine as part of the restoration is to be performed. The target merge location (454) and the target restoration location (452) may be different locations or the same location. The restoration security policies (456) may be restrictions or modifications of a typical workflow that reduce the likelihood that performing the restoration may result in loss of data to third party attackers or other malicious entities. While the example restoration policy (450) is illustrated with a limited number of portions that specify different aspects of a restoration workflow, restoration policies may specify additional, fewer, or different aspects of a workflow without departing from the invention.

In one or more embodiments of the invention, the restoration security policies (456) specify a limited number of target restorations locations where the restored virtual machine may be located. In one or more embodiments of the invention, the restoration security policies (456) specify a limited number of target merge locations where the virtual machine may be initially instantiated. In one or more embodiments of the invention, the backup security policies (456) specify a limited number of clients (or users) that may initiate restoration of a virtual machine. In one or more embodiments of the invention, the backup security policies (456) specify a limited number of backup storages from which data for performing a restoration may be obtained. In one or more embodiments of the invention, the restoration security policies (452) specify a quantity of computing resources to dedicate toward performing a restoration. In one or more embodiments of the invention, the specified quantity of computing resources may cause a computing device performing a restoration to reduce computing resource allocations to other applications while the restoration is being performed. The restoration security policies (452) may specify other aspects of a restoration workflow that enhance, modify, or reduce the security of restoring a virtual machine without departing from the invention.

As discussed with respect to FIG. 3, multiple types of mapping data structures may be utilized when performing the methods illustrated in FIGS. 6A-6D. FIGS. 5A-5C show examples of different types of mappings.

FIG. 5A shows a diagram of an example production host data label to virtual machine tag mapping (500) in accordance with one or more embodiments of the invention. The example production host data label to virtual machine tag mapping (500) may specify a mapping between a data label (502) and a virtual machine tag (504). In other words, the mapping may specify that a virtual machine should be tagged with a particular virtual machine tag (i.e., machine-level tag) when portion of the data hosted by the virtual machine is tagged with a second predetermined label.

FIG. 5B shows a diagram of an example virtual machine tag to security classification mapping (510) in accordance with one or more embodiments of the invention. The example virtual machine tag to security classification mapping (510) may specify a mapping between a virtual machine tag (512) and a security classification (514). In other words, the mapping may specify that a virtual machine should receive a particular security classification (e.g., high, medium, low) when the virtual machine is tagged with a predetermined tag.

FIG. 5C shows a diagram of an example security classification to security policy mapping (520) in accordance with one or more embodiments of the invention. The example security classification to security policy mapping (520) may specify a mapping between a security classification (522) and a security policy (524). In other words, the mapping may specify that a particular security policy that should be applied when the virtual machine receives a particular security classification. The security policy (524) may be, for example, one or more of the policies stored in the security policy repository (320D, FIG. 3). For example, the security policy (524) may include one or more identifiers of one or more security policies, the identifiers may be used to identify the corresponding policies.

While the data structures of FIGS. 4A-5C have been illustrated as separate, the aforementioned may be combined with each other, combined with other data, stored across multiple computing devices, or otherwise combined into macro data structures without departing from the invention.

As discussed above, components of the system of FIG. 1 may perform methods for managing virtual machines by generating backups and performing restoration, in addition to other functions. FIGS. 6A-6D show methods in accordance with one or more embodiments of the invention that may be performed by components of the system of FIG. 1.

Figure 6A:
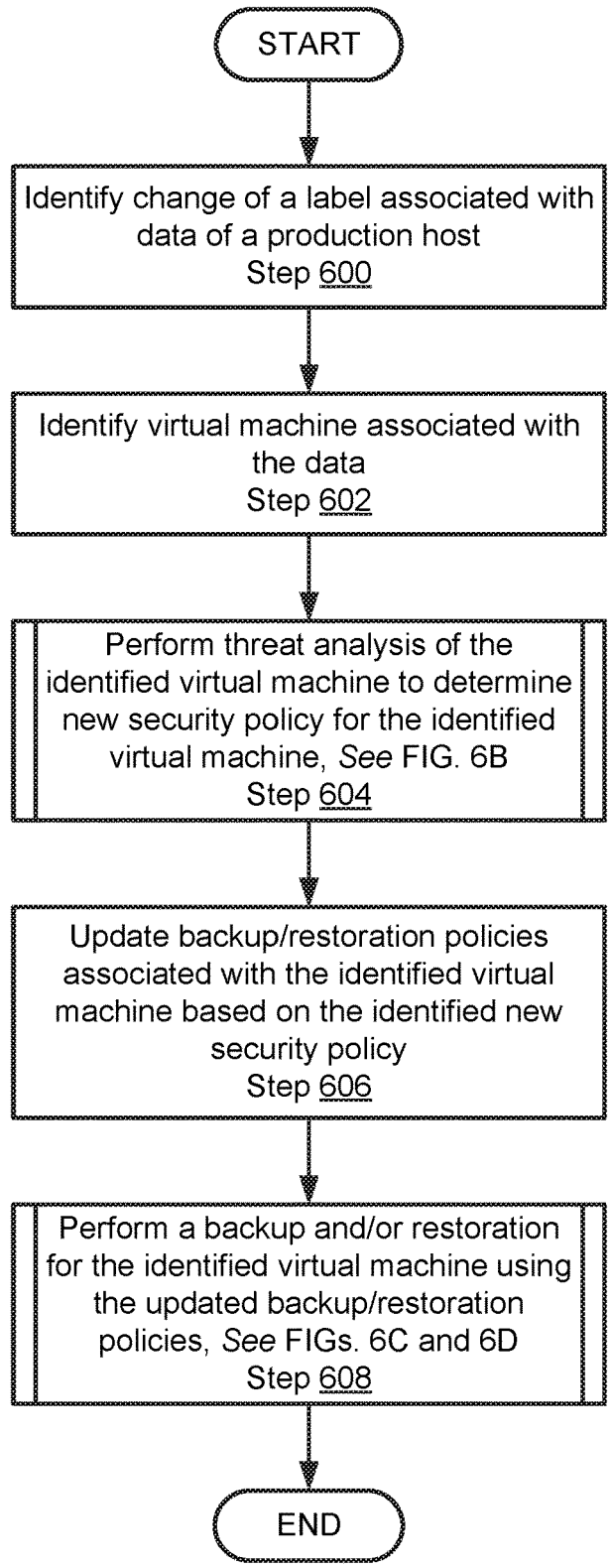
FIG. 6A shows a flowchart of a method of managing virtual machines in accordance with one or more embodiments of the invention.

FIG. 6A shows a flowchart of a method in accordance with one or more embodiments of the invention. The method depicted in FIG. 6A may be used to provide backup and/or restoration services in accordance with one or more embodiments of the invention. The method shown in FIG. 6A may be performed by, for example, a remote agent (e.g., 110, FIG. 1). Other components of the system illustrated in FIG. 1 may perform all, or a portion, of the method of FIG. 6A without departing from the invention.

In Step 600, a change of a label associated with data of a production host is identified.

In one or more embodiments of the invention, the change is identified based on a change in metadata that includes the label. The change may be, for example, a client updating the label by modifying the contents of the metadata. Other entities may update the label without departing from the invention.

In one or more embodiments of the invention, the data is a portion of a virtual machine. The portion may be, for example, application data or an application hosted by the virtual machine.

In Step 602, a virtual machine associated with the data is identified.

In one or more embodiments of the invention, the virtual machine associated with the data hosts the data. The virtual machine may be identified, for example, by consulting with a hypervisor, or other entity, that manages the allocation of resources among entities executing on the production host. In one or more embodiments of the invention, the virtual machine is identified using mappings between various portion of the production host data and one or more virtual machines executing on the production host. The virtual machine may be identified via other methods without departing from the invention.

While virtual machine data has been described above as being contained in a single production host, embodiments of the invention are not so limited. For example, a virtual machine may span across multiple production hosts, e.g., distributed execution, without departing from the invention.

In Step 604, a threat analysis of the identified virtual machine is performed to determine a new security policy for the identified virtual machine.

In one or more embodiments of the invention, performing the threat analysis includes taking into account the change of the label. The changed label may be compared to, for example, production host data label to virtual machine tag mappings to identify a corresponding tag for the virtual machine. A tag for the virtual machine may be updated using the corresponding tag for the virtual machine.

Figure 6B:
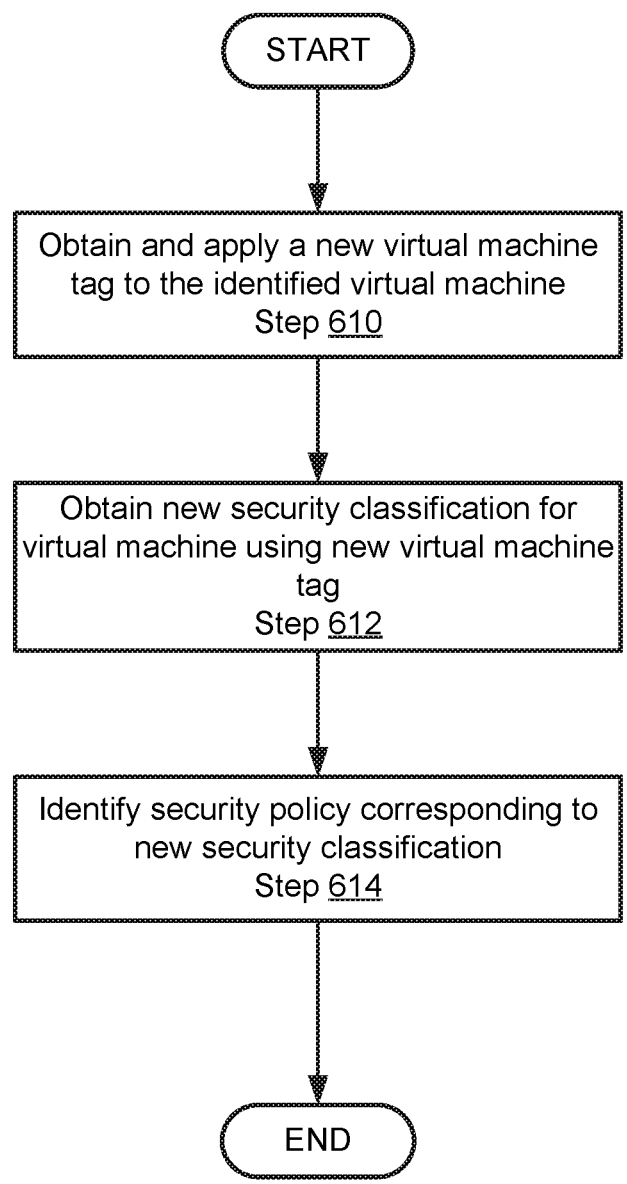
FIG. 6B shows a flowchart of a method of determining new security policy in accordance with one or more embodiments of the invention.

In one or more embodiments of the invention, the new security policy is identified via the method illustrated in FIG. 6B. The new security policy may be identified via other methods without departing from the invention.

In Step 606, backup/restoration policies associated with the identified virtual machine are updated based on the identified new security policy.

In one or more embodiments of the invention, the backup/restoration policies are updated by replacing a portion of the backup/restoration policies with the new security policy. Doing so may change the workflow for performing backups/restorations so that it meets the requirements of the new security policy.

In Step 608, a backup and/or restoration is performed for the identified virtual machine using the updated backup/restoration policies.

Figure 6C:
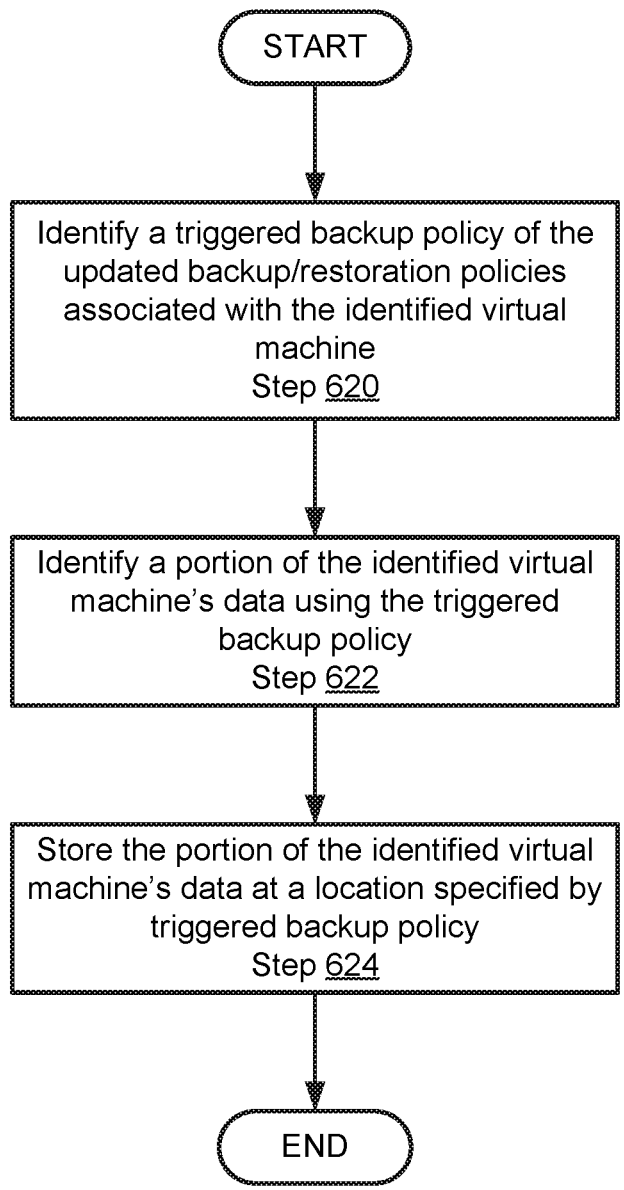
FIG. 6C shows a flowchart of a method of performing a backup of a virtual machine in accordance with one or more embodiments of the invention.

In one or more embodiments of the invention, a backup of the identified virtual machine is performed via the method illustrated in FIG. 6C. The backup may meet the requirements of the identified new security policy. The backup may be performed via other methods without departing from the invention.

Figure 6D:
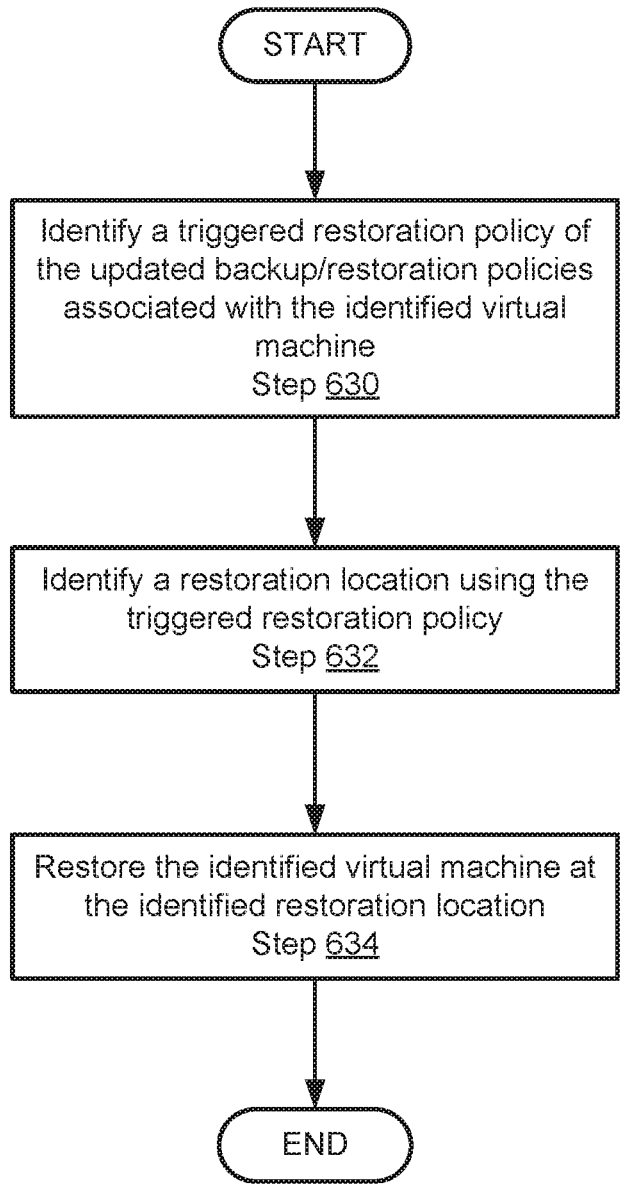
FIG. 6D shows a flowchart of a method of performing a restoration of a virtual machine in accordance with one or more embodiments of the invention.

In one or more embodiments of the invention, a restoration of the identified virtual machine is performed via the method illustrated in FIG. 6D. The restoration may meet the requirements of the identified new security policy. The restoration may be performed via other methods without departing from the invention.

The method may end following Step 608.

FIG. 6B shows a flowchart of a method in accordance with one or more embodiments of the invention. The method depicted in FIG. 6B may be used to perform a threat analysis of a virtual machine to determine a new security policy for the virtual machine in accordance with one or more embodiments of the invention. The method shown in FIG. 6B may be performed by, for example, a remote agent (e.g., 110, FIG. 1). Other components of the system illustrated in FIG. 1 may perform all, or a portion, of the method of FIG. 6B without departing from the invention.

In Step 610, a new virtual machine tag is obtained and/or applied to the identified virtual machine.

In one or more embodiments of the invention, the new virtual machine tag is obtained by matching a type of the label to a mapping (e.g., 500, FIG. 5A). The mapping may relate a type of the label applied to the data to a type of tag to be applied to the identified virtual machine.

In Step 612, a new security classification for the virtual machine is obtained using the new virtual machine tag.

In one or more embodiments of the invention, the new security classification is obtained by matching a type of the new virtual machine tag to a mapping (e.g., 510, FIG. 5B). The mapping may relate a type of the new virtual machine tag to a security classification (e.g., low, medium, high, critical, etc.).

In Step 614, a new security policy corresponding to the new security classification is identified.

In one or more embodiments of the invention, the new security policy is identified by matching the new security classification to a mapping (e.g., 520, FIG. 5C). The mapping may relate the security classification to a security policy. The security mapping may provide an identifier for the security policy.

The identified security policy may be used as the new security policy.

The method may end following Step 614.

FIG. 6C shows a flowchart of a method in accordance with one or more embodiments of the invention. The method depicted in FIG. 6C may be used to perform a backup in accordance with one or more embodiments of the invention. The method shown in FIG. 6C may be performed by, for example, a remote agent (e.g., 110, FIG. 1). Other components of the system illustrated in FIG. 1 may perform all, or a portion, of the method of FIG. 6C without departing from the invention.

In Step 620, a triggered backup policy of the updated backup/restoration policies associated with the identified virtual machine is identified.

In one or more embodiments of the invention, the policy is identified by matching a trigger condition of the triggered backup policy to a characteristic of the state of the system of FIG. 1. For example, the state may be a particular point in time and the trigger condition could be the occurrence of the particular point in time. Other trigger conditions may be used without departing from the invention. For example, the occurrence of a non-temporal event, an addition or removal of a component to the system of FIG. 1, or other changes to the system of FIG. 1 may be trigger conditions of the triggered backup policy.

In Step 622, a portion of the identified virtual machine's data is identified using the triggered backup policy.

In one or more embodiments of the invention, the triggered backup policy includes an identifier of the portion of the identified virtual machine's data. The identifier may be, for example, a uniform resource locator, file name, block identifiers, or any other type of logical and/or physical identifiers.

In Step 624, the identified portion of the identified virtual machine's data is stored at a location specified by the triggered backup policy.

In one or more embodiments of the invention, the triggered backup policy includes storage location information for the data. The storage location information may be, for example, an identifier of a backup storage. The storage location information may be other identifiers of components of the system of FIG. 1, logical storages, and/or physical storages without departing from the invention.

The method may end following Step 624.

FIG. 6D shows a flowchart of a method in accordance with one or more embodiments of the invention. The method depicted in FIG. 6D may be used to perform a restoration in accordance with one or more embodiments of the invention. The method shown in FIG. 6D may be performed by, for example, a remote agent (e.g., 110, FIG. 1). Other components of the system illustrated in FIG. 1 may perform all, or a portion, of the method of FIG. 6D without departing from the invention.

In Step 630, a triggered restoration policy of the updated backup/restoration policies associated with the identified virtual machine is identified.

In one or more embodiments of the invention, the policy is identified by matching a trigger condition of the triggered restoration policy to a characteristic of the state of the system of FIG. 1. For example, the state may be receiving a message from a user that requests performance of the restoration. Other trigger conditions may be used without departing from the invention. For example, the failure of an executing entity by any of the components of FIG. 1, the addition or removal of a component of the system of FIG. 1, or the occurrence of a point in time may be the trigger conditions of the triggered restoration backup policy.

In Step 632, a restoration location is identified using the triggered restoration policy.

In one or more embodiments of the invention, the triggered restoration policy includes an identifier of the restoration location. The identifier may be, for example, a an identifier of a component of the system of FIG. 1. Other identifiers may be used without departing from the invention.

In Step 634, the identified virtual machine is restored at the identified restoration location.

In one or more embodiments of the invention, performing the restoration includes obtaining data associated with the identified virtual machine from backup storage, merging the obtained data to obtain a virtual machine image, generating a differencing disk, instantiating a new virtual machine using the obtained virtual machine image and the differencing disk, and migrating the virtual machine from the instantiation location to the identified restoration location. In one or more embodiments of the invention, the instantiation location and the identified restoration location are different locations. In one or more embodiments of the invention, the instantiation location and the identified restoration location are the same location.

The method may end following Step 634.

To further illustrate aspect of the invention, an example is provided in FIGS. 7A-7E.

EXAMPLE

FIG. 7A shows a diagram of a virtual machine (700) executing on a production host, similar to that of FIG. 1, at a first point in time. The virtual machine (700) hosts a transaction database (701) and an email backup (702). Before the first point in time, clients had labeled both of these applications.

FIG. 7B shows a relationship diagram illustrating the labels applied to the applications (701, 702) by the clients. As seen from FIG. 7B, the transactional database (701) was labeled with a low security label (710) and the email backend (702) was also labeled with a low security label (710).

FIG. 7C shows a diagram of backup storages (720) that store backups for the applications. As seen from FIG. 7C, both backups (725, 726) are stored in low security storage (721) rather than high security storage (722). Both backups are stored in the low security storage (721) because of the low security labels (710) applied to both applications by the clients.

Overtime, the importance of the transactional database (701) increases with respect to the content of the information that it contains. In response to its increased importance, clients relabeled the transactional database (701).

Figures 7D, 7E:
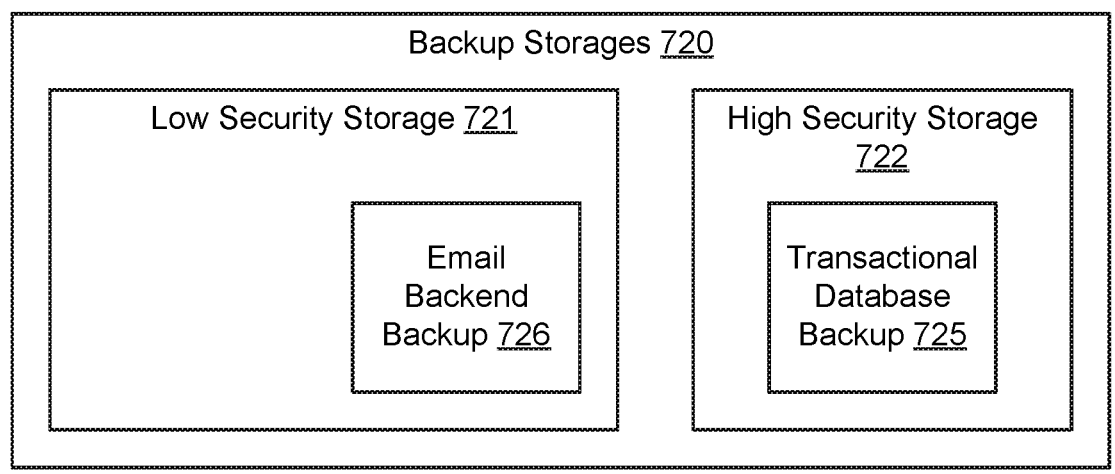
FIG. 7D shows a second diagram of mappings.
FIG. 7E shows a diagram of the backup storage of FIG. 7C at second point in time after the first point in time.

FIG. 7D shows a relationship diagram illustrating the labels applied to the applications (701, 702) after the transaction database (701) increased in importance. As seen from FIG. 7B, the clients applied a high security label (711) to the transaction database.

In response to the change in labeling, following the methods of FIGS. 6A-6B, a remote agent (not shown) performed a backup generation for the applications (701, 702). As part of the backup generation, the policies governing the workflows for performing the backup generations were modified in accordance with the methods of FIGS. 6A-6B. Specifically, the target storage location for storing of the generated backups changed.

FIG. 7E shows a diagram of the backup storages (720) after the backup of the applications (701, 702) was performed using the modified policies. As seen from FIG. 7E, performing the workflows governed by the modified policies resulted in the transaction database backup (725) being stored in the high security storage (722) rather than the low security storage (721).

This, via the example illustrated in FIGS. 7A-7E, the system automatically and dynamically modified its workflows to take into account the relative importance of applications ascribed by clients. By doing so, a granular method of performing backup generations that takes into account the client ascribed characteristics may be provided.

END OF EXAMPLE

Figure 8:
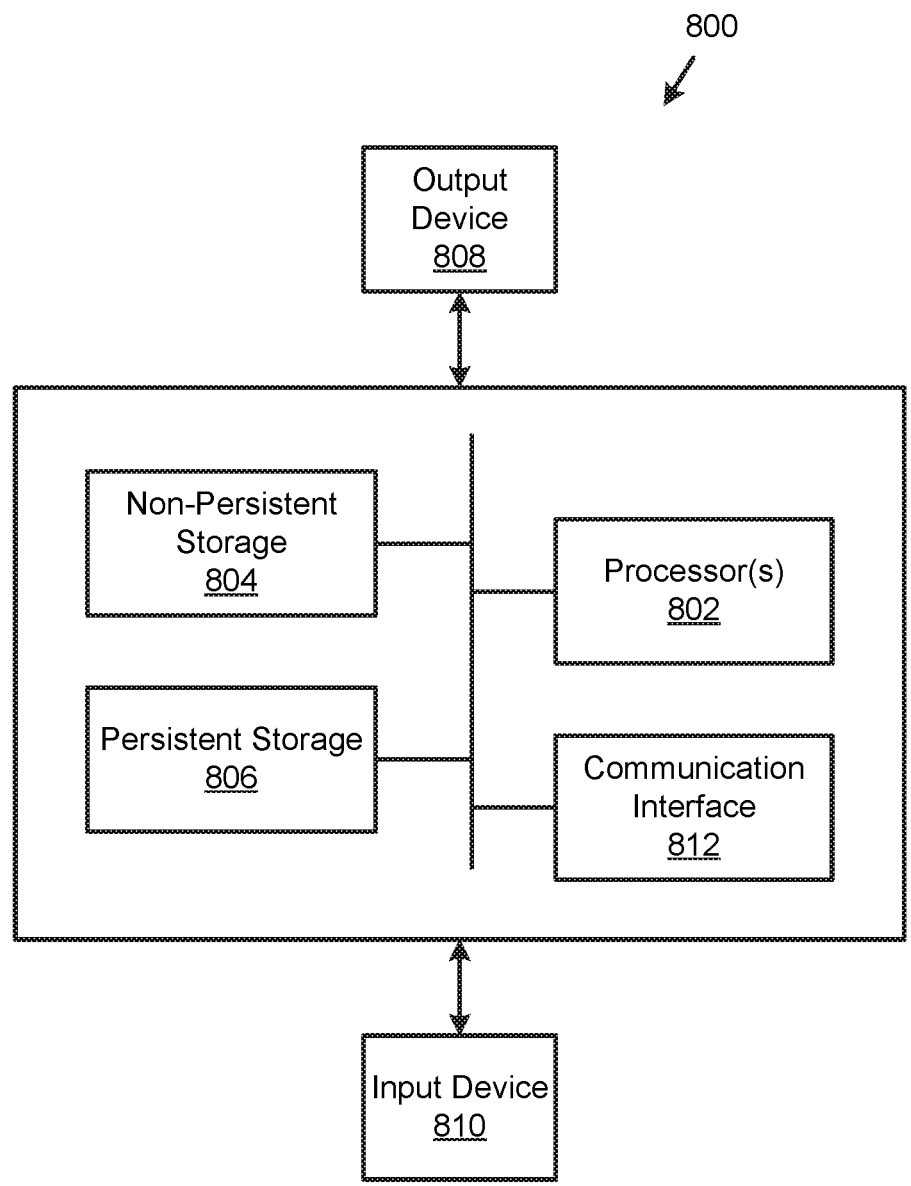
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention may provide an improved process of generating backups. More specifically, the improved process of backup generation may better tailor the allocation of computing resources for performing backups and restorations by taking into account client ascribed characteristics to data. By doing so, less valuable data may be stored using fewer computing resources while more valuable data is stored using more computing resources. Thus, embodiments of the invention may address the problem of allocation of resources in a distributed system for different purposes.

Further, embodiments of the invention may provide an unconventional method of generating backups. For example, a system in accordance with embodiments of the invention may automatically perform a threat analysis for data when the data is labeled by a client. By performing the threat analysis at the time of labeling, a new workflow for performance of a backup generation and/or restoration may be used when performing subsequent backup generations/restorations. By doing so, embodiments of the invention may provide a dynamic system that automatically adapts to the changing roles of applications and hardware devices within a distributed system.

Additionally, embodiments of the invention may provide a more secure distributed system. By tying security policies for workflows to client-ascribed data characteristics, a system in accordance with embodiments of the invention may automatically reduce the likelihood of data loss to malicious attacks.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup agent for facilitating restorations of virtual machines, comprising:
    a persistent storage that stores backup/restoration policies; and
    a backup/restoration policy updater programmed to:
        identify a change of a label associated with a portion of data of a production host, wherein the label specifies a characteristic ascribed to the data by a client that utilizes services provided by a virtual machine of the virtual machines, wherein the characteristic indicates a level of importance of the portion of the data to the client;
        in response to identifying the change in the label:
            perform a threat analysis, using the changed label, of a virtual machine of the virtual machines to determine a new security policy for the virtual machine; and
            update a policy of the backup/restoration policies associated with the virtual machine based on the new security policy,
            wherein the updated policy specifies that a first quantity of computing resources are to be used to generate a backup of the portion of the data, the policy specifies that a second quantity of the computing resource are to be used to generate the backup of the portion of the data, and the first quantity is different from the second quantity.

2. The backup agent of claim 1, wherein the backup/restoration policy updater is further programmed to:
    perform a backup of the virtual machine using the updated policy to store a backup of the virtual machine in a backup storage of a plurality of backup storages.

3. The backup agent of claim 1, wherein the backup/restoration policy updater is further programmed to:
perform a restoration of the virtual machine using the updated policy to restore the virtual machine.

4. The backup agent of claim 1, wherein performing the threat analysis of the virtual machine to determine the new security policy for the virtual machine comprises:
obtaining a new virtual machine tag for the virtual machine based on the change of the label associated with the data of the production host.

5. The backup agent of claim 1, wherein the portion of the data is a file-system block, wherein a second file-system block is labeled with a second label ascribing a second characteristic by the client that is different from the characteristic.

6. The backup agent of claim 1, wherein the first quantity of computing resources is based on level of importance of the portion of the data to the client.

7. The backup agent of claim 1, wherein performing the threat analysis also uses a second label associated with the portion of data to determine the new security policy.

8. The backup agent of claim 2, wherein the updated policy specifies a first number of users that are credentialed to initiate performance of the backup, the policy specifies a second number of users that are credentialed to initiate performance of the backup, and the first number is smaller than the second number.

9. The backup agent of claim 2, wherein the updated policy specifies a first number of target storage locations for storage of the backup, the policy specifies a second number of storage locations for storage of the backup, and the first number is smaller than the second number.

10. The backup agent of claim 3, wherein performing the restoration of the virtual machine returns the virtual machine to a prior state.

11. The backup agent of claim 4, wherein the label associated with the data of the production host is set by a user of the client of the virtual machine.

12. The backup agent of claim 4, wherein performing the threat analysis of the virtual machine to determine the new security policy for the virtual machine further comprises:
obtaining a new security classification for the virtual machine based on the obtained new virtual machine tag.

13. The backup agent of claim 12, wherein performing the threat analysis of the virtual machine to determine the new security policy for the virtual machine further comprises:
identifying a security policy corresponding to the obtained new security classification.

14. The backup agent of claim 13, wherein the security policy specifies a limited set of users authorized to initiate performance of a restoration of the virtual machine.

15. The backup agent of claim 7, wherein performing the threat analysis also uses a third label associated with the portion of data to determine the new security policy, wherein the third label is ascribed by a second client.

16. A method for facilitating restorations of virtual machines using backup/restoration policies, comprising:
identifying a change of a label associated with a portion of data of a production host that hosts at least one virtual machine of the virtual machines, wherein the label specifies a characteristic ascribed to the data by a client that utilizes services provided by the virtual machine of the virtual machines, wherein the characteristic indicates a level of importance of the portion of the data to the client;
in response to identifying the change in the label:
performing a threat analysis, using the changed label, of a virtual machine of the virtual machines associated with the portion of data to determine a new security policy for the virtual machine; and
updating a policy of the backup/restoration policies associated with the virtual machine based on the new security policy,
wherein the updated policy specifies that a first quantity of computing resources are to be used to generate a backup of the portion of the data, the policy specifies that a second quantity of the computing resource are to be used to generate the backup of the portion of the data, and the first quantity is different from the second quantity.

17. The method of claim 16, wherein performing the threat analysis also uses a second label associated with the portion of data to determine the new security policy.

18. A non-transitory computer readable medium comprising computer readable program code, which when executed by a computer processor enables the computer processor to perform a method for facilitating restorations of virtual, the method comprising:
identifying a change of a label associated with a portion of data of a production host that hosts at least one virtual machine of the virtual machines, wherein the label specifies a characteristic ascribed to the data by a client that utilizes services provided by the virtual machine of the virtual machines, wherein the characteristic indicates a level of importance of the portion of the data to the client;
in response to identifying the change in the label:
performing a threat analysis, using the changed label, of a virtual machine of the virtual machines associated with the data to determine a new security policy for the virtual machine; and
updating a policy of the backup/restoration policies associated with the virtual machine based on the new security policy,
wherein the updated policy specifies that a first quantity of computing resources are to be used to generate a backup of the portion of the data, the policy specifies that a second quantity of the computing resource are to be used to generate the backup of the portion of the data, and the first quantity is different from the second quantity.

19. The non-transitory computer readable medium of claim 18, wherein performing the threat analysis also uses a second label associated with the portion of data to determine the new security policy.

* * * * *

UNITED STATES PATENT AND TRADEMARK OFFICE
CERTIFICATE OF CORRECTION

PATENT NO. : 11,030,057 B2
APPLICATION NO. : 16/028679
DATED : October 20, 2020
INVENTOR(S) : Shelesh Chopra, Sunil Yadav and Manish Sharma It is certified that error appears in the above-identified patent and that said Letters Patent is hereby corrected as shown below:

In the Claims

Column 18, Line 60 in Claim 1, the word "resource" should read -- resources --.

Column 20, Line 19 in Claim 16, the word "resource" should read -- resources --.

Column 20, Line 50 in Claim 18, the word "resource" should read -- resources --.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*